Sept. 2, 1947.  G. M. SMITH  2,426,953
AUTOMATIC GRADING TABLE WITH GAUGING SLOTS
Filed Feb. 10, 1945  3 Sheets-Sheet 1
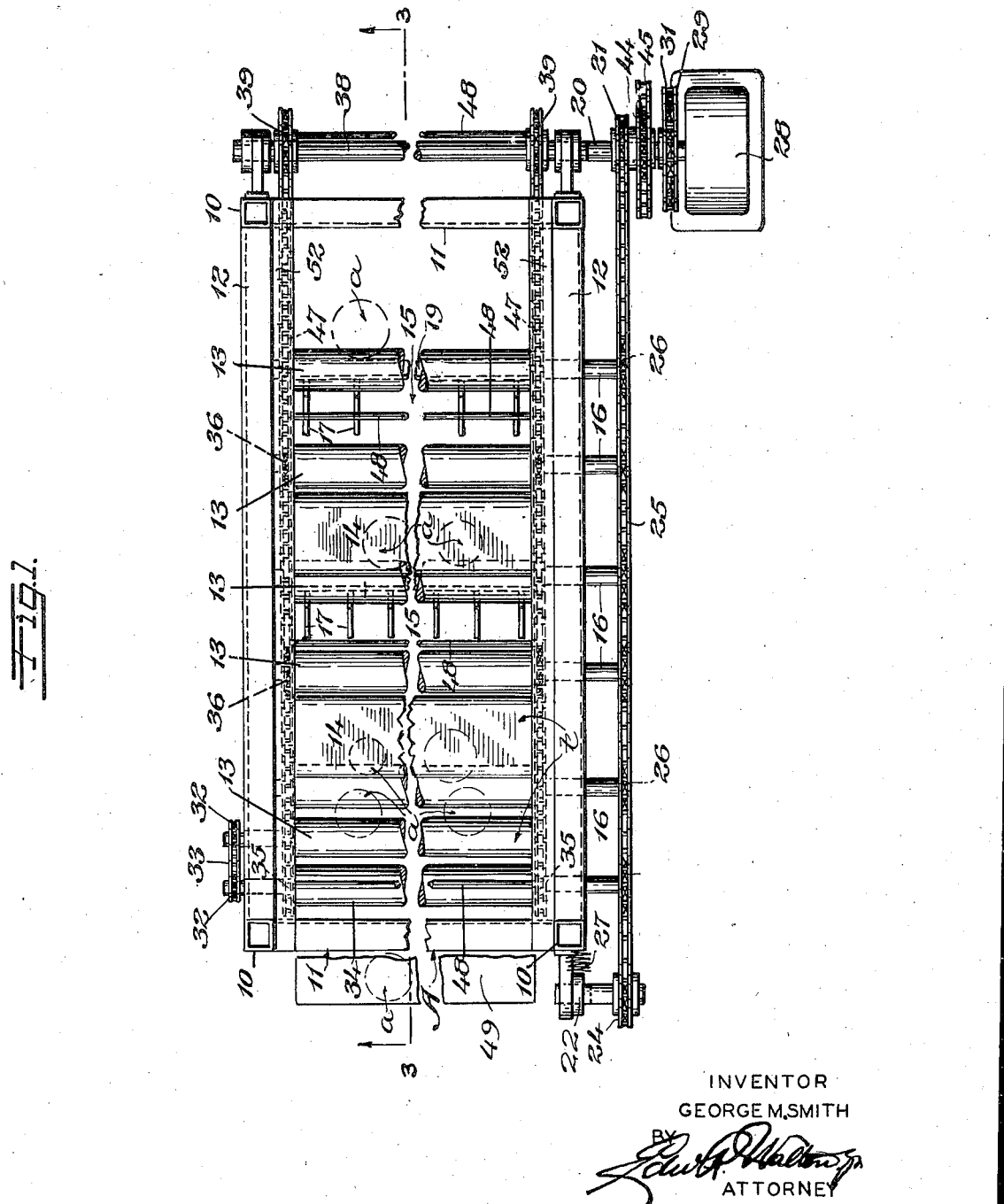
INVENTOR
GEORGE M. SMITH
ATTORNEY

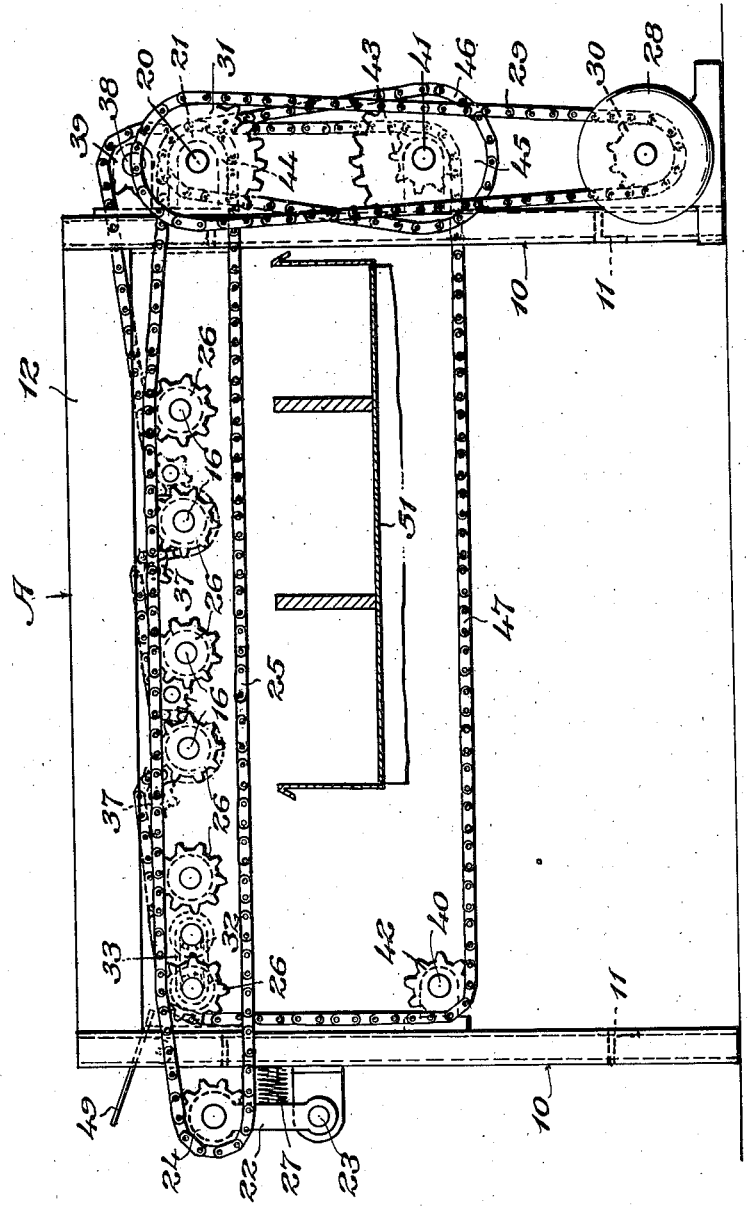

Sept. 2, 1947. G. M. SMITH 2,426,953
AUTOMATIC GRADING TABLE WITH GAUGING SLOTS
Filed Feb. 10, 1945 3 Sheets-Sheet 3
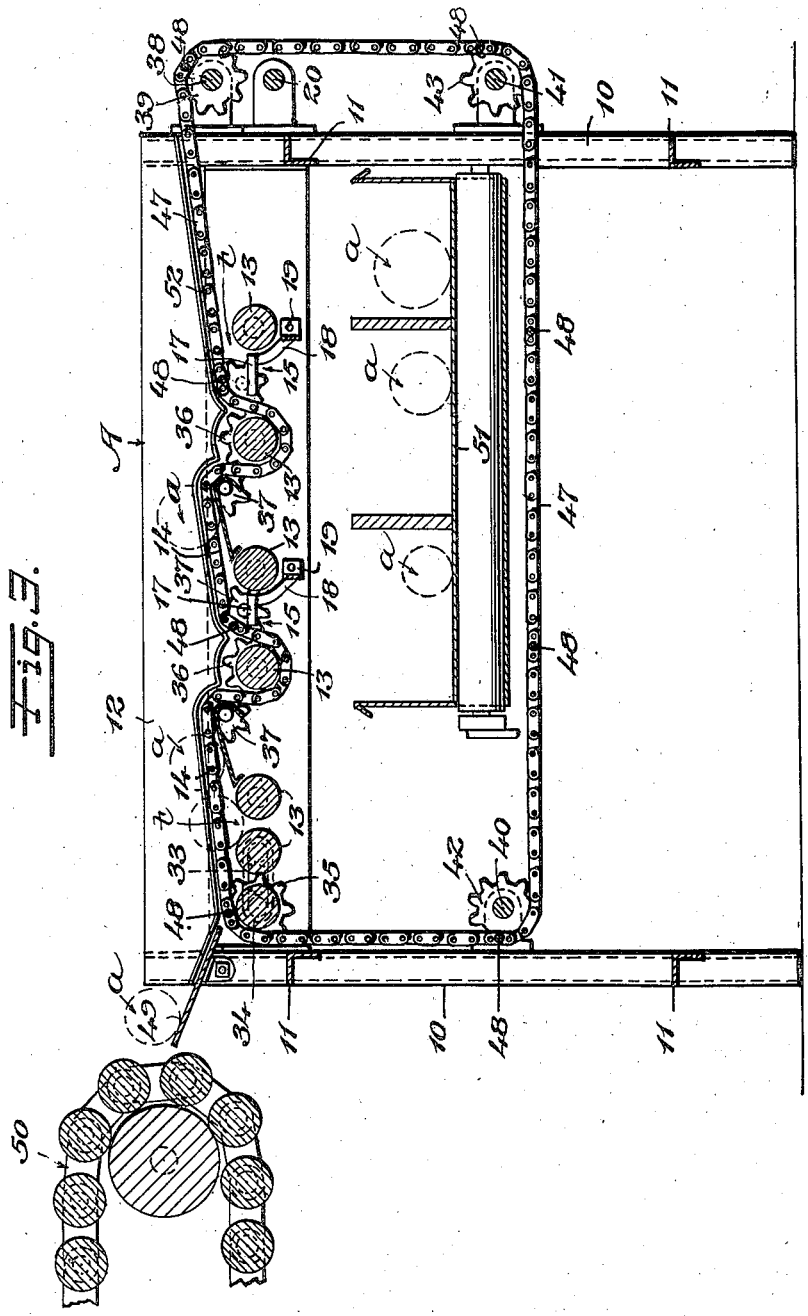
INVENTOR
GEORGE M. SMITH
BY
ATTORNEY Patented Sept. 2, 1947

2,426,953

UNITED STATES PATENT OFFICE 2,426,953

AUTOMATIC GRADING TABLE WITH GAUGING SLOTS

George M. Smith, Orlando, Fla., assignor to American Machinery Corporation, Orlando, Fla., a corporation of Florida Application February 10, 1945, Serial No. 577,272

10 Claims. (Cl. 209—97)

This invention relates to a machine for sorting or grading fruits, vegetables and other articles according to size, and has generally in view to provide a simple, practical, compact, inexpensive machine for this purpose which is thoroughly reliable and highly efficient in operation, particularly for articles such as tomatoes, peaches and the like which easily become mashed or bruised.

Heretofore, and most prevalently such articles have been graded by, so-called "longitudinal machines" and "transverse machines"; the former comprising elongated brushes or rolls (in some cases tapered or stepped) placed in a trough or the like having openings of various sizes spaced along its length and the latter comprising a bed of rotating brushes or rolls over which the articles pass, transversely of the axes of the brushes or rolls, by being pushed forward by the impact of on-coming articles being delivered to the bed, certain of such brushes or rolls being spaced apart different distances to provide a plurality of "drop-openings" along the length of the bed and through which articles of the same or smaller size will pass.

Graders of the "longitudinal type" are comparatively slower in operation and require a great deal more floor space than graders of the "transverse type"; while in graders of the "transverse type," now in use, articles, of a size as will not pass over a drop-opening but large enough as not to drop through an opening, will become jammed between the spaced rotating members and will become mashed, bruised or otherwise injured as well as causing said particular drop-opening to become clogged, resulting in the articles piling-up behind said opening and finally passing over the clogged opening to the next drop-opening, and so on. Thus, it is clear that in the latter case, much of the articles will be improperly graded as well as injured or spoiled.

According to the invention, it is proposed to overcome all of the drawbacks above stated as well as to provide additional advantages.

Generally, the grader of the present invention includes a grading table over which the articles to be graded are advanced, and this table is provided at successively advanced locations with spaces of successively greater widths through which the articles may gravitate. Thus, as the articles are advanced over said table the smaller articles drop through the narrower spaces while the larger articles pass over the narrower spaces and drop through only the wider spaces, whereby sorting or grading of the articles according to size is effected. A machine constructed to operate on this principle has the material advantage of being compact and handling large volumes of articles in relatively short periods of time.

While the present machine may be used for sorting or grading various different articles, it is especially designed for sorting and grading tomatoes and similarly shaped, easily bruised fruits and vegetables, and in this connection it is a special and important object of the invention to provide a machine of the type mentioned embodying a novel construction and mode of operation whereby it is operable to sort or grade tomatoes and like easily bruised vegetables, fruits and other articles rapidly but substantially without any bruising of the same.

It has been found that tomatoes and like articles which are of generally spherical form, but which have more or less flat ends, are best graded according to size by a machine of the present type if they are caused to approach and to drop through the spaces in the grading table with their flat ends disposed upwardly and downwardly, respectively. Accordingly, another special and important object of the present invention is to provide a sorting or grading machine of the type mentioned embodying a construction and mode of operation whereby the tomatoes or similarly shaped articles are caused to approach and to be delivered to the grading spaces with their flat ends disposed upwardly and downwardly, respectively.

A serious disadvantage of prior machines of the present general type is that many of the tomatoes or like articles tend to lodge in the grading spaces and thereby not only detract from the efficiency of the machines, but require the constant attention of an attendant to effect their release, frequently with bruising or mashing of the same. Accordingly, another special and important object of the present invention is to provide a machine of the type mentioned embodying simple, practical means for loosening and advancing, without bruising, any tomatoes or like which may become lodged in the grading spaces.

With the foregoing and other objects in view, which will become more fully apparent as the nature of the invention is better understood, the same consists in a sorting or grading machine embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 1 is a top plan view of a sorting or grading machine constructed in accordance with one practical embodiment of the invention;

Figure 2 is a side elevation of the machine; and

Figure 3 is a longitudinal section through the machine on the line 3—3 of Figure 1.

Referring to the drawings in detail, A designates, generally, the frame of the present machine which may be formed from any suitable material and which, generally speaking, is of elongated, rectangular form. This frame may be of any suitable or desirable length, width and height and may be composed, as shown, of corner uprights or legs 10 connected together by suitable transverse members 11 and longitudinal members 12.

The machine includes what may be termed a grading table, designated as $t$, over which the tomatoes or other articles to be graded, are advanced and which has therein, at successively advanced locations, as regards the direction of advance of the articles, spaces of successively greater widths which extend transversely with respect to the direction of advance of the articles and through which the articles may gravitate, whereby their grading as to size is effected.

The grading table $t$ is located, preferably, at or near the top of the frame A and extends substantially from side to side and from end to end thereof, and the direction of advance of the articles to be graded preferably is longitudinally of said table. In any event, said grading table, preferably, is composed, in part, of a plurality of rollers 13 and in part of a plurality of shelves or platforms 14, one in front of each of the grading spaces designated as 15, although it may be composed only of rollers or only of shelf or platform elements such as are indicated at 14.

The rollers 13, the shelves or platforms 14, and the grading spaces 15 extend transversely of the machine and the rollers 13 preferably are of equal diameters. In any event, the grading spaces 15 are formed by spacing adjacent pairs of the rollers predetermined distances apart, and between each adjacent pair of said rollers there is interposed one of the shelves or platforms 14. In this connection and as illustrated in the present instance, there are three pairs of the rollers 13 and two of the shelf or platform elements 14 therebetween. This, however, is an arbitrary member of said pairs of rollers and said shelf or platform elements which may be increased or decreased as desired.

The rollers 13 and the shelves or platforms 14 may be supported upon a frame A in any suitable or desired manner. For example, the rollers 13 may include shafts or end trunnions 16 which may be journalled in the logitudinally extending members 12 of the frame A, and the shelves or platforms 14 may be suitably fastened at their ends to said members 12. Preferably, the tops of the rollers 13 are disposed in a common horizontal plane, whereas the shelves or platforms 14 preferably are slightly inclined upwardly as regards the direction of advance of the articles. Moreover, each shelf 14 preferably is disposed substantially tangentially to the top of the rearmost of the pair of rollers in front thereof for smooth travel of articles onto the same from said rearmost rollers. Furthermore, the front and the rear marginal portions of the shelves or platforms 14 preferably are turned downwardly and inwardly to avoid sharp edges which might tend to cut or bruise the tomatoes or other articles being advanced over the table $t$. Each shelf or platform 14 preferably extends, as shown, between the rearmost of the pair of rollers 13 in front thereof and the forwardmost of the pair of rollers 13 at the rear thereof.

Preferably, but not necessarily, each grading space 15 is subdivided into rectangular spaces by a series of short, parallel rods 17 spaced apart a distance corresponding to the diameter or size of the articles to be discharged or dropped out at that particular station and which short rods 17 extend longitudinally of the machine and which may be carried by arms 18 extending from cross bars 19 secured at their ends to the longitudinal side-frame members 12. Thus, said rods 17 cooperate with the spaces 15 to insure accurate grading of the articles according to size at each particular station.

The rollers 13 are designed to be rotated during operation of the machine to assist in advancing the articles to be graded over the grading table $t$, and in this connection any suitable means may be provided for rotating said rollers. Preferably, however, for the sake of economy and simplicity, sprocket gearing is employed for rotating said rollers, and this sprocket gearing may be of the form shown. In other words, according to the construction illustrated in the drawings, the frame A has suitably mounted thereon at one end thereof and extending transversely with respect thereto, a horizontally disposed power take-off shaft 20 which may be driven in any suitable manner and which has fixed thereon a sprocket wheel 21. At the opposite end of the frame A is an arm 22 which is pivoted at one end to said frame, as indicated at 23, for forward and rearward swinging movement, and which, at its free end, carries a companion, idler sprocket wheel 24.

Over the sprocket wheels 21 and 24 is engaged an endless sprocket chain 25, while fixed on the shafts or trunnions 16 of the rollers 13 are sprocket wheels 26 with which one reach of said sprocket chain 25 is engaged. Accordingly, rotation of the shaft 20 is effective to rotate the rollers 13, and in this connection the direction of rotation of said rollers is, of course, in a direction to advance the articles over the grading table $t$ toward the wider of the grading spaces 15.

A suitable spring 27 is provided to tend constantly to swing the arm 22 rearwardly to maintain the chain 25 taut, and an electric motor 28 or other suitable prime mover located at any suitable point and connected to the shaft 20 in any suitable manner, may be provided for rotating said shaft. In this connection, and as illustrated in the drawings, the motor 28 is mounted adjacent to the machine and is operatively connected to the shaft 20 for driving the same through the instrumentality of an endless sprocket chain 29 extending over sprocket wheels 30 and 31 fixed on the shaft of said motor and on the shaft 20, respectively.

In any instance where any two of the rollers 13 are disposed so closely adjacent to each other as to preclude the possibility of equipping both of the same at corresponding ends thereof with sprocket wheels 26 to be engaged by the sprocket chain 25, one of said rollers may be equipped with a sprocket wheel 26 to engage said chain and to be driven thereby and the two rollers may be provided at their opposite ends with sprocket wheels 32 connected by a sprocket chain 33 whereby the other is driven. In the present machine there is a driving connection of this character between the front roller of the first pair and a lead-in roller 34 for the articles to be graded disposed in front of the said front roller of the first pair, the said lead-in roller 34 being driven directly by the sprocket chain 25 and the said front roller of the first pair being driven by said roller 34.

In the present machine dependence is not placed solely upon rotation of the rollers 13 to advance the articles to be graded over the grading table because the table t may be composed of the platform member 14. On the contrary, other and more positively acting means is provided not only for the purpose of advancing the articles over the grading table, but for dislodging and advancing any articles which may become lodged in the grading spaces 15.

To this end, there is provided on the shafts 16 to the rear of each grading space 15 or on trunnions 16 of the lead-in roller 34, as the case may be, sprocket wheels 35, while on the shafts or trunnions 16 of the front rollers of the second and subsequent pairs of the rollers 13, adjacent to opposite ends thereof, are mounted, for free rotation relative thereto, idler sprocket wheels 36. In addition, each idler sprocket wheel 36 has related thereto a pair of idler sprocket wheels 37, which may be mounted upon the members 12 and which are disposed above and forwardly and rearwardly, respectively, of said idler sprocket wheels 36.

Upon the rear end of the frame A, at preferably a slightly higher elevation than the rearmost idler sprocket wheels 37, is suitably mounted a horizontal shaft 38 which extends transversely of the machine and which has mounted thereon a pair of sprocket wheels 39. In addition, two other transversely extending, horizontal, shafts 40 and 41 are suitably mounted upon the frame A at the front and the rear ends thereof, respectively, suitably below the grading table t, and have mounted thereon pairs of sprocket wheels 42 and 43, respectively.

On the power take-off shaft 20 and on the shaft 41 are fixed sprocket wheels 44 and 45, respectively, which are connected by an endless sprocket chain 46, whereby said shaft 41 is driven by said power take-off shaft 20, while extending beneath the sprocket wheels 42 and 43 of the shafts 40 and 41, respectively, over the idler sprocket wheels 35 of the lead-in collar 34 and over the sprocket wheels 39 of the shaft 38, as well as over the pairs of idler sprocket wheels 37 and beneath the idler sprocket wheels 36, are endless sprocket chains 47 which are connected at points suitably spaced apart along their lengths by article pusher rods 48, extending transversely of the bed or table t.

Due to the described mounting of the sprocket chains 47, they are driven in harmony with the roller 34 and the pairs of rollers 13 and their upper reaches are caused to travel over the table t toward the rear of the machine to cause the pusher rods 48 to engage articles disposed upon said table t and positively to advance them therealong.

The articles, such as tomatoes, to be graded may be supplied to the front end of the table a in any suitable manner. For example, there may be provided at the front end of the machine a shelf or chute 49 which is inclined downwardly toward the front end of the table t and upon which the tomatoes or the like may be delivered either manually or by a suitable conveyor, designated as 50, to roll or slide down said shelf to the front end of said table t. In any event, assuming delivery of tomatoes or the like to the front end of the table t, and driving of the rollers 34 and 13 and the pusher rods 48 in directions to advance the tomatoes or the like over said table toward its discharge end, it is apparent that the smaller tomatoes or the like will gravitate through the forward or narrower of the grading spaces 15 and that the larger tomatoes or the like will bridge and pass over the narrower of said grading spaces and gravitate through only the wider of the same. Thus, depending upon the number of the grading spaces 15 which may be provided and the differences in their widths, the tomatoes or the like will be graded as to size with all necessary accuracy.

The pairs of idler sprocket wheels 37 are disposed so that the upper reaches of the sprocket chains 47 travel over the shelves or platforms 14 at suitable elevations thereabove, whereby the pusher rods 48 also are caused to travel over said shelves or platforms at suitable elevations thereabove so as to engage the tomatoes or the like and advance them over said shelves or platforms. During their advance the tomatoes or the like may roll or slide, but since the shelves or platforms 14 are flat, and since tomatoes and the like have flat ends, their natural tendency, as they are advanced over said shelves or platforms, is to seek positions with one or the other of their flat ends engaging said shelves or platforms. Thereby they will be positioned or oriented to subsequently slide over said shelves or platforms and to be delivered from the latter to the grading spaces 15 with their flat ends disposed lowermost and uppermost, respectively, for most accurate grading according to size by said grading spaces. This positioning or orienting of the tomatoes or the like is assisted by the agitation imparted to them by rollers preceding the platforms 14 and the upward and forward inclination of said shelves or platforms which prevent the tomatoes or the like from rolling freely to the grading station spaces 15.

Some of the tomatoes or the like may become lodged in the spaces at the grading station 15. Due, however, to the described disposition of the idler sprocket wheels 37 relative to the idler sprocket wheels 36, the upper reaches of the sprocket chains 47 and, consequently, the pusher rods 48, are caused to travel downwardly through the grading table t rearwardly of or preceding the grading spaces 15 and upwardly through said grading spaces as shown in Figures 1 and 3. As a result, any tomatoes or the like which may have become lodged in the grading spaces 15 will be engaged from beneath and lifted and dislodged and further advanced by one or another of the pusher rods 48 as the latter successively move upwardly through said grading spaces.

It will thus be apparent that the present machine not only is operable to position and to deliver the tomatoes or the like to the grading station spaces 156 for most accurate grading of the same by said spaces, but that said spaces will be maintained free of lodged tomatoes or the like whereby the machine is rendered highly efficient in operation. Obviously, the pusher rods 48 will gently engage not only the tomatoes or the like resting upon the shelves or platforms 14, but also any tomatoes or the like which may become lodged in the grading spaces 15, and will gently lift and dislodge the latter tomatoes or the like. Therefore, any cutting or bruising of the tomatoes or the like by the present machine is practically avoided.

Either suitable receptacles or suitable conveyor means, such as indicated at 51, may be provided below the grading table t to receive the graded tomatoes or the like which drop through the grading spaces 15. Moreover, suitable shields 52 may extend from the members 12 in overlying relationship to the upper reaches of the sprocket chains 47 to prevent contact of the tomatoes or the like with said sprocket chains.

From the foregoing description considered in connection with the accompanying drawings, it is believed that the construction and operation of the present machine will be clearly understood and its advantages appreciated. It is desired to point out, however, that while only a single, specific structural embodiment of the machine has been illustrated and described, the same is readily capable of various other specifically different structural embodiments within the spirit and scope of the invention as defined in the appended claims.

What I claim is:

1. A machine for grading articles according to size comprising a grading table to have the articles to be graded advanced thereover, said table having therein, at successively advanced locations as regards the direction of advance of the articles, a plurality of article grading station spaces of successively greater widths and which extend transversely to the direction of advance of the articles and through which the articles may gravitate, said table including flat shelf or platform elements forming continuous uninterrupted surfaces between said grading station spaces, a plurality of spaced article pusher rods extending transversely relative to said table, and means for advancing said pusher rods substantially the length of said table to cause them to advance the articles thereover.

2. A machine for grading articles according to size comprising a grading table to have the articles to be graded advanced thereover, said table having therein, at successively advanced locations as regards the direction of advance of the articles, a plurality of article grading station spaces of successively greater widths and which extend transversely to the direction of advance of the articles and through which the articles may gravitate, said table including flat shelf or platform elements forming continuous uninterrupted surfaces between said grading spaces, said shelf or platform elements being upwardly inclined as regards the direction of advance of the articles, and means adapted to travel substantially the length of said table for advancing the articles over said shelf or platform elements to said grading spaces.

3. A machine for grading articles according to size comprising a grading table to have the articles to be graded advanced thereover, said table having therein, at successively advanced locations as regards the direction of advance of the articles, a plurality of article grading station spaces of successively greater widths and which extend transversely to the direction of advance of the articles and through which the articles may gravitate, article pusher means extending substantially across said table, means to advance said pusher means substantially the length of said table to permit them to advance the articles to be graded thereover, and means to cause said pusher means, during the advance of the pusher means to travel upwardly through said grading station spaces to dislodge from said spaces and to further advance any articles which may become lodged in said spaces.

4. A machine for grading articles according to size comprising a grading table to have the articles to be graded advanced thereover, said table having therein, at successively advanced locations as regards the direction of advance of the articles, a plurality of article grading station spaces of successively greater widths and which extend transversely to the direction of advance of the articles and through which the articles may gravitate, said table being composed in part of pairs of spaced rollers which extend transversely to the direction of advance of the articles and the rollers of the respective pairs of which are laterally spaced apart to provide said grading spaces, spaced article pusher means extending substantially across said table, means to advance said pusher means substantially the length of said table to cause them to advance the articles to be graded thereover, and means to cause said pusher means during their advance to travel upwardly through said grading station spaces to dislodge from said spaces and to further advance any articles which may become lodged in said spaces.

5. A machine for grading articles according to size comprising a grading table to have the articles to be graded advanced thereover, said table having therein, at successively advanced locations as regards the direction of advance of the articles, a plurality of article grading station spaces of successively greater widths and which extend transversely to the direction of advance of the articles and through which the articles may gravitate, means in said grading station spaces dividing them into a plurality of spaces each of a size corresponding to the size of the individual article to be graded at each grading station spaced article pusher means extending substantially across said table, means to advance said pusher means substantially the length of said table to cause them to advance the articles to be graded thereover, and means to cause said pusher means during their advance to travel upwardly through said grading station spaces to dislodge from said spaces and to further advance any articles which may become lodged in said spaces, said dividing means in said grading station spaces terminating short of the path of movement of said pusher means.

6. A machine for grading articles according to size comprising a grading table to have the articles to be graded advanced thereover, said table having therein, at successively advanced locations as regards the direction of advance of the articles, a plurality of article grading station spaces of successively greater widths and which extend transversely to the direction of advance of the articles and through which the articles may gravitate, said table being composed in part of pairs of rollers which extend transversely to the direction of advance of the articles and the rollers of the respective pairs of which are laterally spaced apart to provide said grading spaces, said table being composed in other part of shelf or platform elements between said pairs of rollers, article pusher rods extending transversely relative to said table, means to advance said pusher rods over said shelf or platform elements to cause them to advance the articles to be graded over said shelf or platform elements to said grading spaces, and means to cause said rods to travel downwardly through said table forwardly of the front roller of each pair and upwardly through the grading spaces between the rollers of the respective pairs, thereby to dislodge from said grading spaces and to further advance any articles which may become lodged in said grading spaces.

7. A machine for grading articles according to size comprising a grading table to have the articles to be graded advanced thereover, said table having therein, at successively advanced locations, as regards the direction of advance of the articles, a plurality of article grading spaces of successively greater widths which extend transversely to the direction of advance of the articles and through which the articles may gravitate, said table being composed in part of pairs of rollers which extend transversely to the direction of advance of the articles, the rollers of the respective pairs being laterally spaced apart to provide said grading spaces, said table being composed on other part of flat shelf or platform sections between said pairs of rollers, idler wheels at the ends of and axially aligned with the front roller of each pair, a pair of idler wheels related to each first mentioned idler wheel and disposed forwardly and rearwardly thereof, respectively, and thereabove, endless sprocket chains extending over said pairs of idler wheels and beneath said first mentioned idler wheels, article pusher rods extending between said sprocket chains, and means for driving said sprocket chains to cause said rods to move over said shelf or platform elements to advance articles thereover to said grading spaces and also to cause said rods to travel upwardly through said grading spaces to dislodge therefrom and to further advance any articles which may become lodged therein.

8. A machine for grading articles according to size comprising a grading table to have the articles to be graded advanced thereover, said table having therein at successively advanced locations, as regards the direction of advance of the articles, a plurality of article grading spaces of successively greater widths and which extend transversely to the direction of advance of the articles and through which the articles may gravitate, an idler wheel at each side of the machine in advance of each grading space, a pair of idler wheels related to each first mentioned idler wheel and disposed forwardly and rearwardly of the first idler wheel, respectively, endless sprocket chain extending over said pair of idler wheels and beneath said first mentioned idler wheels, article pusher rods extending between said sprocket chains, and means for driving said sprocket chains to cause said rods to advance articles over said table and also to cause said rods to travel downwardly through said table in advance of said grading spaces and upwardly through said grading spaces to dislodge therefrom and to further advance any articles which may become lodged in said spaces.

9. A machine for grading articles according to size comprising a frame including side members, a grading table carried by said frame to have advanced thereover the articles to be graded, said table having therein at successively advanced locations, as regards the direction of advance of the articles, a plurality of article grading spaces of successively greater widths and through which the articles may gravitate, said table being composed in part of pairs of rollers which extend transversely to the direction of advance of the articles, the rollers of the respective pairs being spaced apart to provide said grading spaces, said table being composed in other part of flat shelf or platform elements between said pairs of rollers, said rollers including shaft elements at their ends supported by the side members of said frame, an idler wheel mounted on the shaft element at each end of the front roller of each pair, a pair of idler wheels related to each first mentioned idler wheel and disposed forwardly and rearwardly thereof, respectively, and thereabove, said pairs of idler wheels being mounted on said frame side members, endless sprocket chains extending over said pairs of idler wheels and beneath said first mentioned idler wheels, article pusher rods extending between said sprocket chains, means for driving said sprocket chains to cause said rods to move over said shelf or platform elements to advance articles thereover to said grading spaces and also to cause said rods to travel downwardly through said table in advance of said grading spaces and upwardly through said grading spaces to dislodge therefrom and to further advance any articles which may become lodged therein, and means for rotating said rollers to assist in advancing the articles to be graded over said grading table.

10. A machine for grading articles according to size comprising a grading table to have the articles to be graded advanced thereover, said table having therein, in successively advanced locations as regards the direction of advance of the articles, a plurality of article grading station spaces of successively greater widths and which extend transversely to the direction of advance of the articles and through which the articles may gravitate, and means for advancing the articles over said table to said grading station spaces and adapted to travel through a tortuous path that extends substantially the length of said table, said means traveling above said table only between said stations.

GEORGE M. SMITH.

REFERENCES CITED

The following references are of record in the file of this patent:

UNITED STATES PATENTS

| Number | Name | Date |
| --- | --- | --- |
| 1,512,240 | Ryan | Oct. 21, 1924 |
| 2,370,262 | Sandmeyer | Feb. 27, 1945 |
| 1,099,407 | Swayger | June 9, 1914 |
| 2,365,822 | Jones | Dec. 26, 1944 |
| 908,012 | Koistinen | Dec. 29, 1908 |
| 2,295,190 | Zenge et al. | Sept. 8, 1942 |
| 1,839,614 | Symons | Jan. 5, 1932 |

FOREIGN PATENTS

| Number | Country | Date |
| --- | --- | --- |
| 440,407 | Germany | Feb. 5, 1927 |